May 16, 1967 S. N. CRAIG ET AL 3,319,897
WASTE DISPOSAL UNIT

Filed Sept. 8, 1964 5 Sheets-Sheet 1

INVENTORS
SAM N. CRAIG
WILLIAM H. COMBS
FRANCIS E. HILBERT
HARRY L. KEMPER
ARTHUR B. TAHAR

BY Kane, Dalsimer + Kane

ATTORNEYS

May 16, 1967 S. N. CRAIG ET AL 3,319,897
WASTE DISPOSAL UNIT
Filed Sept. 8, 1964 5 Sheets-Sheet 2

INVENTORS
SAM N. CRAIG
WILLIAM H. COMBS
FRANCIS E. HILBERT
HARRY L. KEMPER
ARTHUR B. TAHAR

BY Kane, Dalsimer + Kane
ATTORNEYS

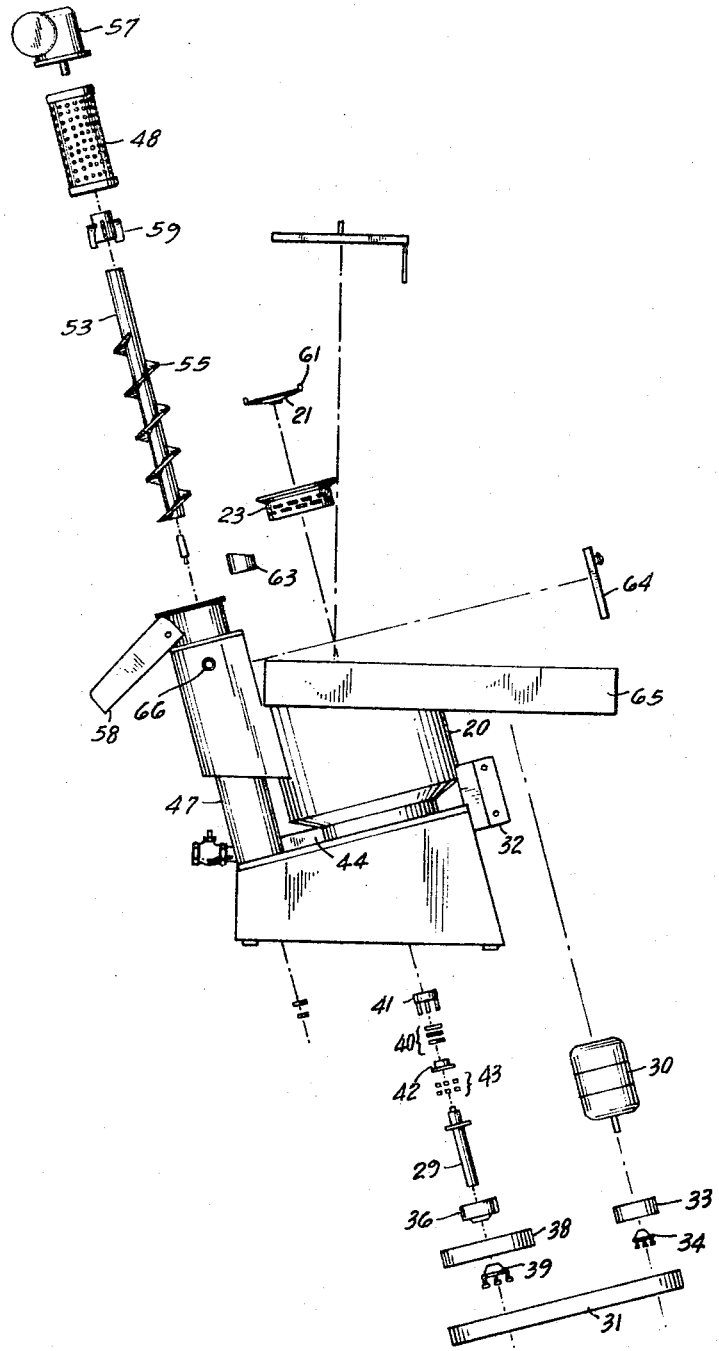

May 16, 1967 S. N. CRAIG ET AL 3,319,897
WASTE DISPOSAL UNIT
Filed Sept. 3, 1964 5 Sheets-Sheet 4
FIG. 6
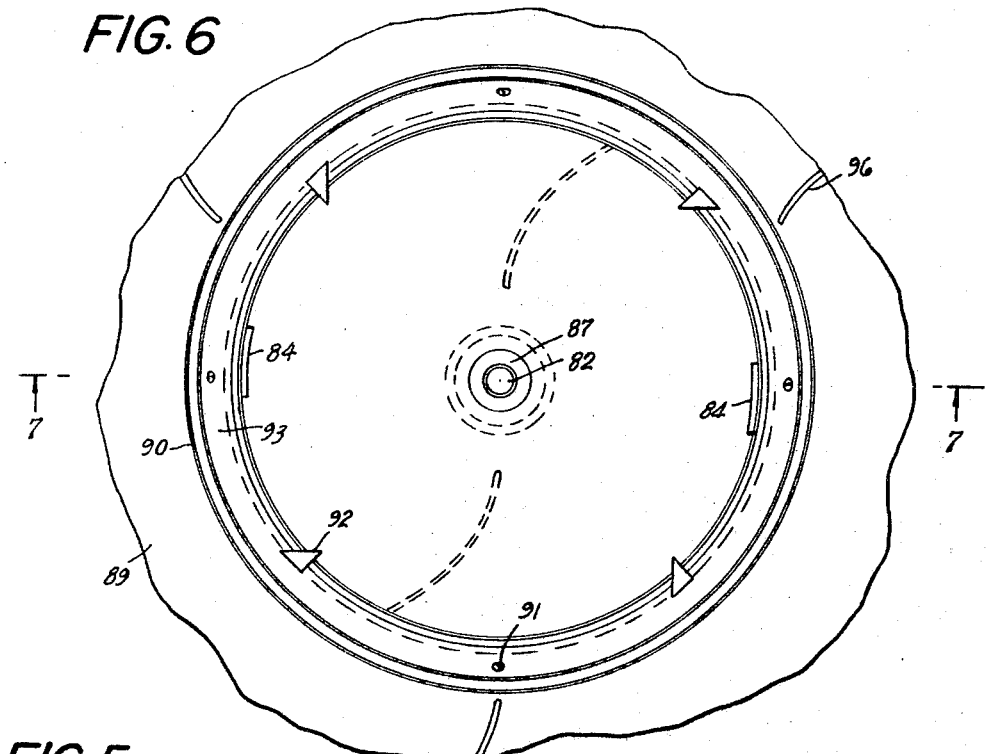
FIG. 5
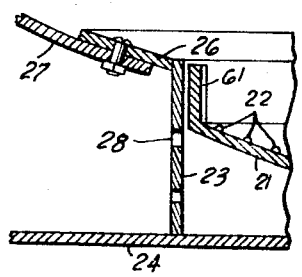
FIG. 8
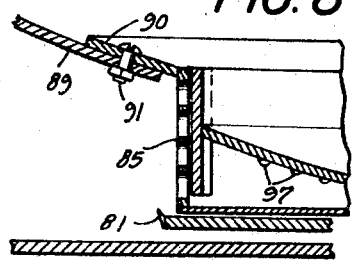
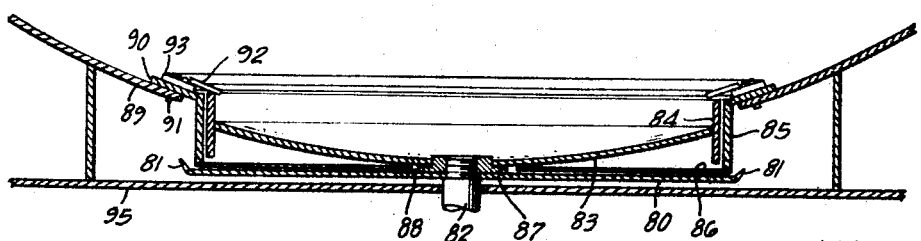
FIG. 7
INVENTORS
SAM N. CRAIG
WILLIAM H. COMBS
FRANCIS E. HILBERT
HARRY L. KEMPER
ARTHUR B. TANAR
BY Kane Dalsimer & Kane
ATTORNEYS May 16, 1967  S. N. CRAIG ET AL  3,319,897
WASTE DISPOSAL UNIT
Filed Sept. 8, 1964  5 Sheets-Sheet 5
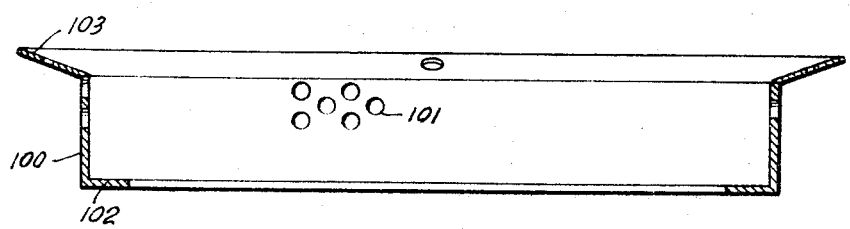
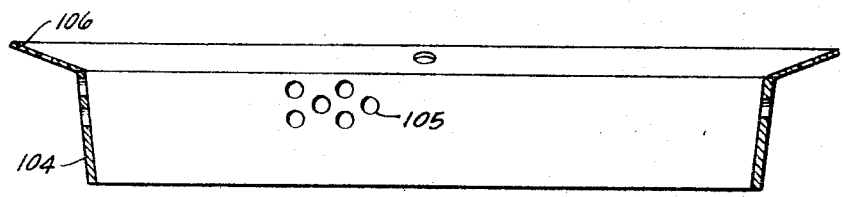
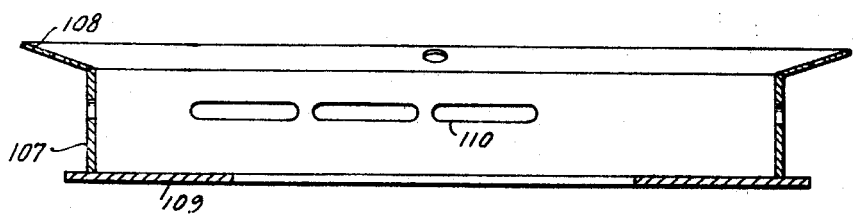
INVENTORS
SAM N. CRAIG
WILLIAM H. COMBS
FRANCIS E. HILBERT
HARRY L. KEMPER
ARTHUR B. TAHAR
BY Kane, Dalsimer & Kane
ATTORNEYS 3,319,897
WASTE DISPOSAL UNIT
Sam N. Craig and William H. Combs, Devon, Francis E. Hilbert, Coatesville, Harry L. Kemper, Honey Brook, and Arthur B. Tahar, West Chester, Pa., assignors to Somat Corporation, Coatesville, Pa., a corporation of Delaware
Filed Sept. 8, 1964, Ser. No. 394,751
17 Claims. (Cl. 241—46)

This invention relates generally to waste disposal apparatus and more particularly to such a unit which is uniquely compact and integrated and in which a variety of types of waste can be disintegrated and the degree of disintegration of the waste prior to disposal can be controlled.

A waste disposal unit constructed in accordance with the teachings of this invention and the manner of using the same is described below with reference to the drawings in which:

FIG. 4 is an exploded view of the waste disposal unit shown in FIGS. 1 through 3;

FIG. 5 is an enlarged segmentary section of the waste disposal unit shown in FIGS. 1 through 4;

FIG. 6 is a segmentary view of an alternate embodiment of the invention;

FIG. 7 is a sectional view taken along the line 7—7 in the direction of the arrows in FIG. 6;

FIG. 8 is an enlarged segmentary view of a portion of the alternate embodiment as shown in FIG. 7;

FIG. 9 is a sectional view of one form of security ring assembly utilized in the invention;

FIG. 10 is a sectional view of another form of security ring assembly utilized in the invention; and FIG. 11 is a sectional view of still another form of security ring assembly utilized in the invention.

Figure 1:
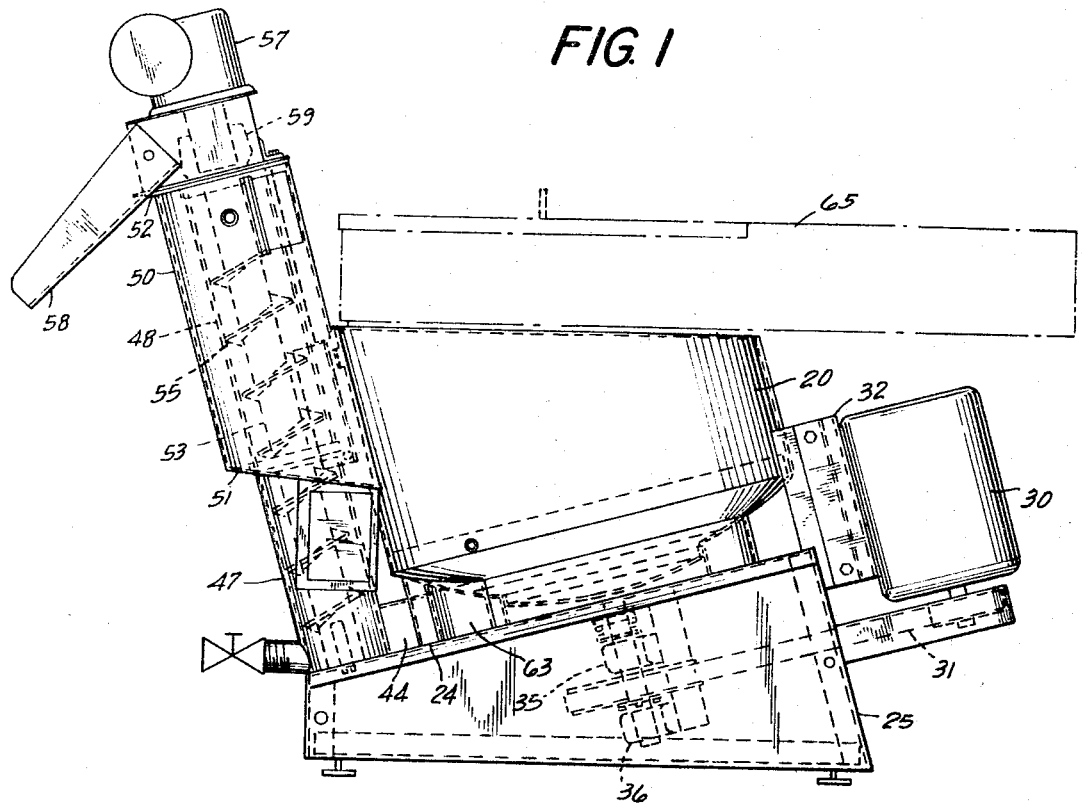
FIG. 1 is a side elevation of a waste disposal unit constructed in accordance with the teachings of this invention.
Figure 2:
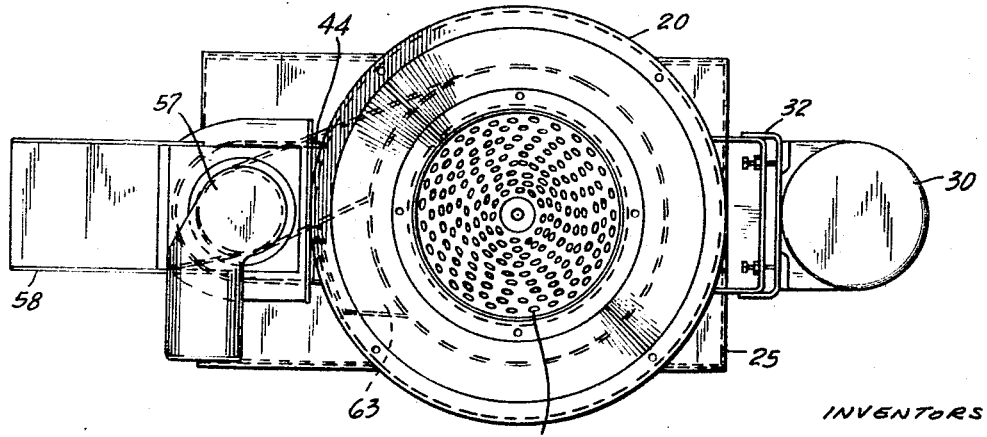
FIG. 2 is a top view thereof with the hood removed.

The waste disposal unit disclosed in FIGS. 1 through 5 includes a cylindrical tank 20 into which the waste can be projected for distintegration and a grinder impeller 21 at the bottom thereof containing cutting teeth 22 on the upper surface thereof which may extend over the entire surface or span a portion of the supper surface of the impeller near the periphery. An assembly consisting of security ring 23 surrounding the impeller and bottomed on inclined upper surface 24 of base 25 and wear ring 26 forming a peripheral flange of ring 23 is provided. The wear ring extends from the upper peripheral surface of security ring 23 to head 27 forming the bottom of tank 20. The security ring is provided with a plurality of horizontal slots 28 through which a combination of water and disintegrated material can flow as the impeller which is mounted on shaft 29, is rotated by motor 30 through belt 31.

Motor 30 is supported on base 25 by motor mounting bracket 32 and is linked to belt 31 as seen in the exploded view of FIG. 4 by drive sheave 33 and bushing 34. Shaft 29 of the impeller is supported in bearings 35 and 36 and driven by belt 31 through driven sheave 38 and bushing 39. A packing is provided consisting of packing 40, packing gland sleeve 41 and packing glands 42 held in position by nuts 43.

A slurry outlet 44 consisting of upper plate 45 and side plates 46 connect the security ring with the pulp discharge cylinder 47 which projects perpendicularly upwardly from the upper surface 24 of the base supporting screen 48 of a hydra extractor assembly indicated in the figures generally by the numeral 49. Cylindrical shell 50 surrounds screen 48 and is spaced therefrom. The shell bottom and hood are indicated respectively by the numerals 51 and 52 and a hydra extractor screw 53 is mounted for rotational movement within shell 50 and cylinder 47 by fastening means 54 at upper surface 24 of base 25. The screw 53 contains flites 55 and is fixed to shaft 56 of motor 57. Discharge chute 58 extends from the hood 52 and an adjustable cutter 59, the function of which will be explained below, is supported at the bottom of hood 52 beneath the entrance 60 to chute 58 and above the flites 55.

Figure 3:
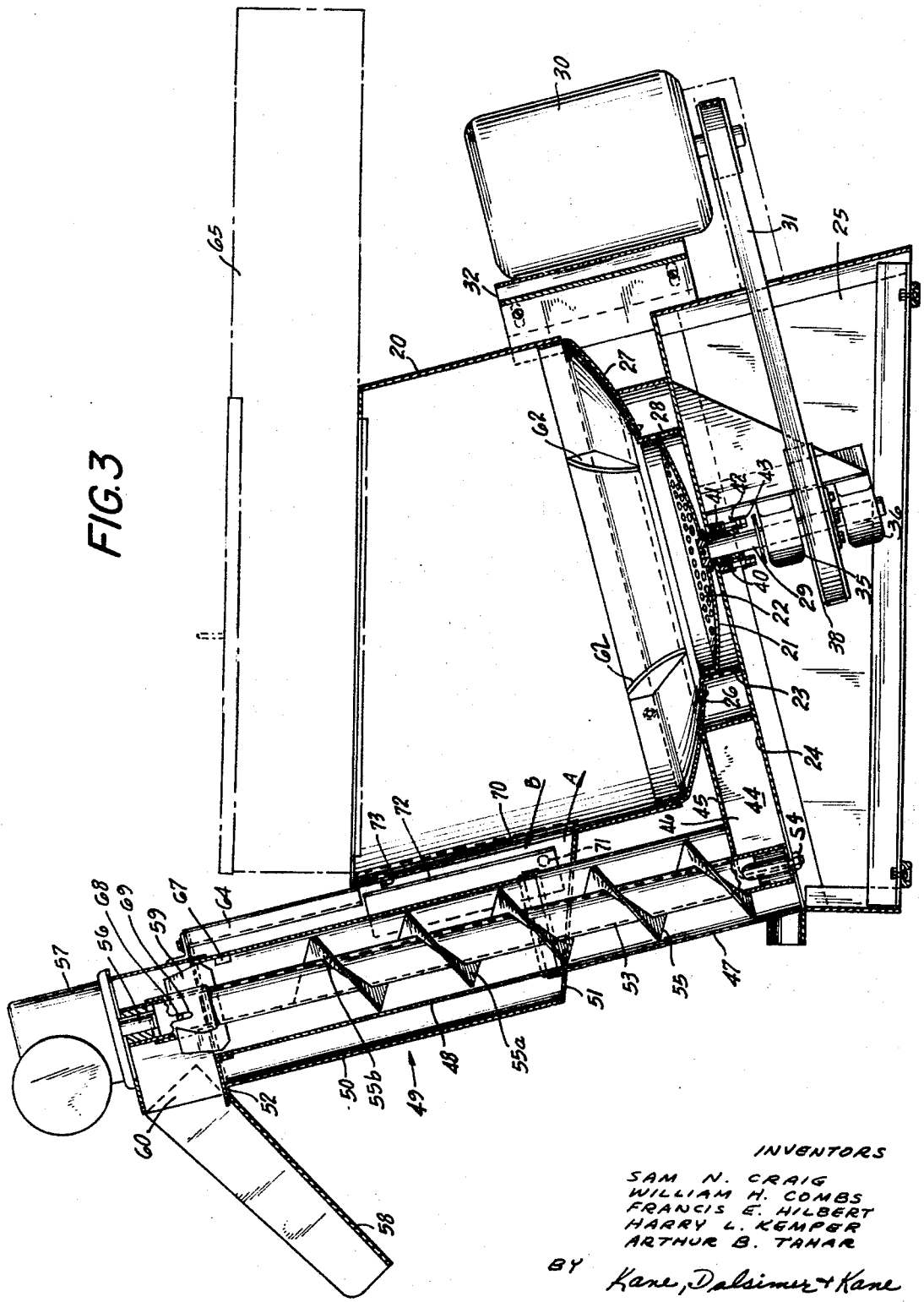
FIG. 3 is a sectional elevation of the unit shown in FIG. 1 with details of construction disclosed.

The impeller is provided with upwardly and outwardly extending ears 61, and baffles 62 are shown in FIG. 3 mounted in the tank head 27. A junk basket 63 is provided in head 27 and access to the shell can be made through access lid 64. Feed tray 65 is mounted on top of cylinder 20.

It is noted that in the configuration provided the upper surface of base 25 is inclined downwardly in the direction of the slurry outlet toward discharge cylinder 47 and the impeller axis of rotation is parallel to the axis of rotation of the hydra extractor screw 53.

In the utilization of the apparatus the material to be disintegrated and disposed of is inserted in feed tray 65 and allowed to fall into cylindrical tank 20 and encounter the impeller 21. Fresh water is allowed to enter the unit, for example, at the point indicated in FIG. 4 by the numeral 66 and the level of the liquids in which the waste material is disposed is controlled by an automatic water controller device which is not shown in these figures. The water could be allowed to enter the unit at other points in accordance with good design practice. Two separate drive motors are shown. Motor 30 for the impeller and motor 57 for the screw 53. This is a mater of design only and a single motor could be used with gear linkages and drives to operate both rotating components. As the impeller is rotated, the screw is also rotated and the material in tank 20 is disintegrated by encountering the impeller to form a slurry which consists of the liquid with small solids somewhat in suspension, and the slurry flows through slurry outlet 44 to the base of screw 53 within pulp discharge cylinder 47. No pump is necessary in this unit as the slurry flows into the extractor by means of gravity, the pumping effect of the grinding impeller and by the lifting effect of the screw 53 in the extractor. Water returns to the grinding tank from the extractor by straight gravity. Hence, rotation of the screw 53 causes the slurry to rise on the flites 55 of the extractor. The slurry rises because the flites provide a continually inclined surface and as the slurry rises the solids are continually forced upwardly toward cutter 59 and the liquids are squeezed out of the solids, passed through screen 48 and fall back into the unit.

The security ring 23 as heretofore described, is provided with elongated horizontally disposed slots 28. The configuration of the slots is important for particular application and the elongated slot 28 is used primarily in an application wherein plastic coated paper is to be disposed of by the unit, such as plastic coated milk cartons. In such an application, it is important to allow the material being disintegrated to pass through security ring 23 before the plastic is separated from the paper. Certain problems, however, arise with such a slot since materials such as sticks, silverware, and miscellaneous metal can pass through the slots due to the elongated configuration. Smaller slots or circular holes are used for other applications such as a security application in which it is desired to be assured that all of the documents inserted in the unit are completely disintegrated. Depending upon the degree of security desired, or the paper used, the holes can be smaller or larger. Small holes will prevent any material going through which would be large enough to jam the extractor. One of the difficulties, however, of the utilization of small holes is the extra force that must be developed in order to move the slurry into the extractor. This problem will be considered in greater detail in the second embodiment disclosed herein.

Ears 61 provided on impeller 21 are important since the ear is allowed to wipe against the security ring 23 or close to the security ring providing a very small clearance as seen in FIG. 5. The ear is an important aspect of this invention in that it provides for additional grinding and also provides additional pumping action by the impeller. Each of these ears is formed of a hard metallic substance and can be in the form of a cutting blade or merely in the form of an upwardly directed obstruction. Its primary purpose is to effect a wiping action.

The impeller can be flat or concave as is well known in the art.

Referring again to extractor 49, the presence of cutter 59 at the upper portion of the hydra extractor has been described. In operation, as the pulp moves up the extractor screw 53 on flites 55, a solid plug of material is formed at the top of the screw. This solid plug would not discharge from the extractor through discharge chute 58 as it has become one large wad and tends to jam up. The cutter breaks up this wad into small sized particles which can be easily discharged from the unit through entrance 60 and chute 58. In the present embodiment, the cutter is bolted right through the extractor screw shaft and as the shaft rotates the plug does not rotate and since the cutter is attached rigidly to the shaft, it rotates, thereby cutting into the plug. The material will not feed properly if the plug rotates and, therefore, in certain applications where material such as fiberglass is being disintegrated and where the plug has a tendency to rotate, stops or lands 67 as seen in FIG. 3 are provided which actually catch the plug and prevent it from rotating. The cutter 59 shown in FIG. 3 is fastened to the screw 53 at fastener 68 projecting through vertical channel 69 in the cutter. This allows for adjustment of the position of the cutter axially of screw 53. The cutter is adjustable in order to regulate the length of plug. The length of plug determines both the dryness of the material being discharged through discharge chute 58 and also the amount of power required to turn the screw 53. Lowering of cutter 59 to shorten the plug results in wetter material being disposed at discharge 58 and less motor horsepower. As the cutter is raised, the plug becomes longer, the discharge material drier, however, the drive motor requires more power.

As the material from the slurry moves up the hydra extractor flites 55, the moisture is forced from the slurry outwardly through screen 48. The liquids fall by gravity through the clearance space between shell 50 and screen 48 and strikes plate 51 and passes back into the cylindrical tank 20 in accordance with arrow A as shown in FIG. 3, through the opening 70 in cylindrical tank 20. If the water level in the cylindrical tank 20 were to rise above plate 51, the slurry could go directly through opening 70 into the extractor in the direction of the arrows B, even though normally there is a large volume of water falling from the extractor back in to the cylindrical tank 20 in the direction of the arrow A which tends to overcome the tendency of the slurry to wash in and around the extractor through opening 70. If there exists an excess of water of appreciable quantity, the fresh water might be forced to flow directly out of the overflow connection 71 and also taking some of the slurry out of the overflow connection. In order to solve this problem, shield or overflow baffle 72 is provided in the extractor shell. Such a baffle 72 is not used in security applications but rather is used in an application wherein inadvertently an excess of water or other liquid might be inserted into cylindrical tank 20. The overflow baffle is held in position by a fastening means such as set screw 73.

In certain embodiments of the invention it may be advisable to provide a brush or bristle-type surface on the undersurface 55a of flites 55 in the hydra extractor. In order for the screw to operate properly in the hydra extractor, it is necessary that the material being fed slide freely on the flite and, therefore, the friction between the screen 48 and the plug or material rising on the flites must be greater than the friction between the screw flites and the material. If the reverse were true, the material would merely rotate with the screws as if it were attached to it and not move upwardly along the flites. By providing a brush undersurface 55a on the flites while allowing the upper surface 55b to be metallic, a smooth upper surface for the material to ride on is provided and a brush is also provided which can brush the screen 48 continually keeping the screen clear and open so that the holes in the screen would not become clogged and therefore prevent water from returning through the screen and building up a pressure in the screw.

A plurality of baffles 62 are provided in the head of cylindrical tank 20 above impeller 21. The baffles are concave in a direction opposite to the direction of rotation of the impeller. The baffles are provided to give a reverse or return action to the material which is being thrown outwardly radially by centrifugal force when the impeller rotates. The baffles tend to bring the material back toward the center of rotation preventing the material from clinging to the periphery of the tank and make the material encounter the impeller more often.

Considering now the impeller configuration as mentioned above, the impeller can be provided with rows of teeth near the outer edge of the upper surface of the impeller and also can be provided with teeth covering the entire upper surface of the impeller. In the disintegration of certain materials, for example, a box with well-defined edges and of a size sufficiently small that a large portion of the box will encounter the teeth on the impeller having teeth only on the upper outer surface, a satisfactory pulping can result. However, if the box is large so that, for example, only a corner can encounter teeth so provided, such as a beer carton, then the pulping action could not be satisfactory and it would be advisable to provide teeth over the entire upper surface of the impeller. This would provide additional points of contact between the impeller teeth and the carton improving the pulping action. An additional advantage is gained wherein the upper surface of the impeller is completely covered with teeth in that teeth nearer the center or axis of rotation of the impeller move at a lower rotational speed than the teeth near the periphery of the impeller. Since these teeth move slower, the impact force or force of impact of teeth on items to be pulped is less than the force of impact upon the teeth further out towards the periphery of the impeller. As a result, the teeth nearer the center can be made taller because of the decreased impact even though it has been found that taller teeth are more susceptible to breakage during impact. Also the teeth towards the center could be formed of a harder and more brittle material permitting the hardest and most brittle teeth to be used, whereas, brittle teeth of this type would crack and break off if used on the surface of the impeller near the outer edge.

An alternate security ring and impeller construction for use in the unit is shown in FIGS. 6 through 8 wherein a flat, steel, circular disk 80 provided with upwardly directed peripheral pumping ears 81 is mounted on common shaft 82 which also mounts impeller 83 which is provided with cutting ears 84. The cutting ears are closely fitted to security ring 85 which has a wear plate 86 attached at its lower edge. The wear plate can be attached or formed integrally with the security ring. The wear plate on its inner edge is spaced from impeller hub 87 to provide an annular space 88. The wear plate fits between the rotating impeller 83 and disk 80.

The outside diameter of disk 80 is slightly smaller than the diameter of the opening in the bottom of tank head 89 and the pumping ears 81 extend beyond this dimension but because of the spacing of the pumping ears the assembly can be inserted through the opening in the tank head 89. The wear ring 90 which extends outwardly from the upper edge of security ring 85, as did ring 26 in the embodiment of FIG. 5, is fastened to head 89 of the tank by suitable fastening means indicated by the numeral 91. The cutting ears 84, two of which are shown herein displaced 180°, extend both above and below the impeller 83 and are closely fitted to the security ring 85.

Four steel cutting blades 92 are mounted on the wear ring in spaced relation. In the embodiment shown in FIG. 7 the construction is such that the cutters 92 are first mounted on cutter ring 93 which is then fastened to wear ring 90 of the security ring. This is mere choice and any suitable method of mounting can be utilized.

The ears 84 in the present embodiment are adjustable radially by means of a screw attachment 94 allowing the ears to be brought toward and away from the wall of the security ring. The adjustable ears are useful in certain applications, however, ears welded directly may be readily utilized. It is important, however, that the ear cover all of the holes in the vertical plane in which it is disposed of the security ring, so that in certain applications the ear may not span the security ring from top to bottom but may only be above the actual impeller plate since functionally the portions of the ear above and below the holes in the security ring are not important. If there are holes in the security ring below the level of the impeller there could occur a back flow of material in underneath the security ring unless the ears extend downwardly to cover these holes. The ears act as a pump impeller and force material outward through the holes instead of permitting it to be sucked in.

The purpose of the disk 80 with the pumping ears 81 is to create a pumping action outside of the security ring and around the full perimeter of the security ring, therefore sucking material outwardly through the security ring instead of depending only upon it being forced through by the impeller and ears 84 thereof. In effect, therefore, a pumping action is obtained resulting from the impeller 83 with ears 84 thereon, pumping outwardly and a sucking action from the pumping ear 81 on the rotating disk 80.

Wear plate 86 prevents material from passing beneath the security ring in strips which would be large enough to jam the extractor or the pump in a remote unit. It is noted that in the embodiment shown in FIG. 7 the security ring 85 does not extend downwardly to plate 95, whereas, in the embodiment of FIG. 5, the security ring 23 extends downwardly with no clearance between it and plate 24. The wear plate is without perforations or openings so that the material must pass through the security ring aided by the pumping and the sucking described above. It has been found that the more resilient materials readily pass through the openings in the security ring in such an application. The baffles in the second embodiment are indicated by the numeral 96.

Triangular cutters 92 aid in the handling of resilient material, such as plastic or rags of the type which have a tendency to bounce off the teeth of the impeller without providing resistance. Also such material as rags, plastic and string have a tendency to wind up in a ball as twisted by the rotation of the impeller and as the ball spins the cutter 92 will cut or shear the material. The cutters are spaced far enough above the ear 84 and are sloped backwardly in relation to the direction of flow of material so that they cannot act as hooks or tend to cause jamming of metal. The clearance will permit metal to flip out of the way and the backward pitch prevents a piece from catching solidly enough so that further pieces could build up and finally jam the machine.

The utilization of an adjustable ear is useful when stringy material is being disintegrated which might go part way through the holes in the security ring. The adjustable ear then will tend to shear such material.

In the embodiment disclosed in FIG. 8, a pattern of teeth indicated by the numeral 97 is placed beneath the impeller. The teeth 97 are roughly in the shape of a backwardly curved pump impeller blade. The purpose of these teeth is to first cut, the second to eject any material that may find its way underneath the impeller which without these teeth could build up and jam it.

The security ring may be either straight or angularly shaped depending upon the application and the holes may vary in size.

In FIGS. 9, 10 and 11 several types of security rings are shown. In the example shown in FIG. 9, security ring 100 having circular holes 101 is provided with a foreshortened or flanged type wear plate 102 and wear ring 103.

The security ring 104 shown in FIG. 10 is provided with holes 105 and wear ring 106.

The security ring shown in FIG. 11 is designated by the numeral 107 and has a wear ring 108 and a wear plate 109 with hollow cylindrical slots. Depending upon the application, the security ring will be selected. For the one-piece impeller of the type disclosed in the first embodiment herein, the security ring of the type shown in FIG. 10 but with elongated slots of the type shown in FIG. 11, has been provided and designated by the numeral 23.

This type security ring has been described as being used for plastic coated papers. The security rings disclosed in FIGS. 9 and 10 would be utilized with one piece impellers for straight paper and/or food waste, since these do not utilize a substantial wear ring.

Considering the impeller 23 and viewing the slots 110 in FIG. 11, it is noted that the slot length must be at least four times its width in order to be effective. For the general range of material the minimum slot width generally should be no less than approximately ¼″ with a maximum slot width no greater than approximately ⅝″. Smaller dimensions would lose the effectiveness of the slot for plastic type materials, and a greater width than ⅝″ would permit material of far too large a size to pass through. This would be both from the standpoint of jamming the extractor and also from the standpoint of the actual destruction of the waste required. If the slot length to width ratio is significantly less than four, the slot actually acts as a round hole and does not let the material through nearly as quickly as with the elongated slot and also when the slot length to width ratio is less than three, there is a definite tendency for the slot to plug. These dimensions are for general security ring thicknesses in the range from 3/16 to 5/16 of an inch thick and the limits would be modified slightly for rings of lesser or greater thickness. The slots should be horizontal slots to accomplish the function of letting paper with plastic backing pass through. Vertical slots will act almost exactly the same as holes, since the length is in the vertical direction relative to the rotational direction of the impeller.

The slot dimensions and the type of security ring will be modified in accordance with the application desired.

Thus, among others, the several objects of the invention as heretofore suggested have been achieved. Obviously, numerous changes in design can be made without departing from the spirit of the invention as claimed herein.

We claim:

1. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, an ear attached at the periphery of said impeller and spaced from said sieve with a vertical dimension sufficient to span the apertures of said sieve.

2. A waste disposal unit in accordance with claim 1 in which the space between said ear and said sieve is adjustably changeable.

3. A waste disposal unit in accordance with claim 1 in which the bottom edge of said sieve engages said bottom of the tank.

4. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller power means for rotating said impeller in a predetermined direction and a baffle in said tank having a surface directed oppositely to the direction of rotation of said impeller whereby material thrown outward radially by centrifugal force will be directed inwardly toward said impeller.

5. A waste disposal unit in accordance with claim 1 in which a cutting blade is supported in said tank overlying said impeller.

6. A waste disposal unit in accordance with claim 5 in which said cutting blade is supported to project radially inwardly and spaced above the horizontal plane of said ear.

7. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a shaft supporting said impeller, a disk attached to said shaft spaced beneath said impeller with a diameter greater than said sieve, a wear plate in the form of a circular member attached to the bottom edge of said sieve between said impeller and said disk, a central opening formed in said wear plate through which said shaft projects and an annular space provided between said shaft and said wear plate.

8. A waste disposal unit in accordance with claim 7 in which a pumping ear is provided on the peripheral edge of said disk.

9. A waste disposal unit in accordance with claim 8 in which said pumping ear is on a radius greater than the radius of said sieve.

10. A waste disposal unit in accordance with claim 9 in which a cutting blade is provided in said tank overlying said impeller.

11. A waste disposal unit in accordance with claim 9 in which a baffle is provided in said tank having a surface directed oppositely to the direction of rotation of said impeller.

12. A waste disposal unit comprising an annular wall and a bottom forming a tank for receiving waste material and water, a disk impeller in said tank circumferentially spaced from said wall, an upper surface of said impeller, material disintegrating cutter on said upper surface, a sieve in the form of a tubular member having through apertures supported in said tank and encircling said impeller, a hydra-extractor, a passage from said wall to said hydra-extractor, flights of said hydra-extractor, a metal upper surface of said flights, and a brush-like lower surface of said flights.

13. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a hydra-extractor, a passage from said wall to said hydra-extractor, first means for supplying fresh water to said tank, overflow means, and baffle means between said first means and said overflow means.

14. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a hydra-extractor, a passage from said wall to said hydra-extractor, and a plurality of cutting teeth provided on the lower surface of said impeller, each of said teeth having the configuration of a backwardly curved pump impeller blade.

15. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a hydra-extractor, a passage from said wall to said hydra-extractor and apertures of said sieve elongated in a horizontal plane with the hole length to width ratio greater than four.

16. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a hydra-extractor, a passage from said wall to said hydra-extractor, and said material disintegrating cutters on said upper surface nearest the center are formed of a harder and more brittle material than the cutters radially outwardly thereof.

17. A waste disposal unit comprising an annular wall and a bottom forming a tank for receiving waste material and water, a disk impeller in said tank circumferentially spaced from said wall, an upper surface of said impeller, material disintegrating cutters on said upper surface, a sieve in the form of a tubular member having through apertures supported in said tank and encircling said impeller, a hydra-extractor, a passage from said wall to said hydra-extractor, flites of said hydra-extractor, a cutting blade above said flites and mounted for rotary motion therewith, a stationary screen surrounding said flites, and lands attached to said stationary screen and projecting toward said flites.

References Cited by the Examiner

UNITED STATES PATENTS

| 2,681,598 | 6/1954 | Baxter | 241—278 |
| 3,164,329 | 1/1965 | Wandel | 241—46 |
| 3,188,942 | 6/1965 | Wandel | 241—46 |

WILLIAM W. DYER, JR., *Primary Examiner.*

G. A. DOST, *Assistant Examiner.*